United States Patent
Lingham et al.

(10) Patent No.: US 10,535,063 B2
(45) Date of Patent: Jan. 14, 2020

(54) SYSTEMS AND METHODS FOR SECURING DIGITAL GIFT CARDS WITH A PUBLIC LEDGER

(71) Applicant: First Data Corporation, Greenwood Village, CO (US)

(72) Inventors: Vinodan K. Lingham, Los Altos, CA (US); Mark Levitt, Foster City, CA (US); Krisan Ramesh Nichani, San Francisco, CA (US); Guillaume P. Lebleu, San Francisco, CA (US)

(73) Assignee: First Data Corporation, Atlanta, GA (US)

(*) Notice: Subject to any disclaimer, the term of this patent is extended or adjusted under 35 U.S.C. 154(b) by 957 days.

(21) Appl. No.: 15/072,137

(22) Filed: Mar. 16, 2016

(65) Prior Publication Data

US 2016/0267474 A1 Sep. 15, 2016
US 2017/0011392 A9 Jan. 12, 2017

Related U.S. Application Data

(63) Continuation-in-part of application No. 14/658,097, filed on Mar. 13, 2015, now abandoned.
(Continued)

(51) Int. Cl.
*G06Q 20/38* (2012.01)
*G06Q 20/36* (2012.01)
(Continued)

(52) U.S. Cl.
CPC ......... *G06Q 20/382* (2013.01); *G06F 3/0484* (2013.01); *G06F 21/645* (2013.01);
(Continued)

(58) Field of Classification Search
CPC combination set(s) only.
See application file for complete search history.

(56) References Cited

U.S. PATENT DOCUMENTS 6,138,106 A * 10/2000 Walker .................. G06Q 20/28
                                                  235/381
6,745,940 B1 * 6/2004 Korst ..................... G06Q 20/28
                                                  235/375
(Continued)

FOREIGN PATENT DOCUMENTS

WO    WO-2013188601 A1 * 12/2013 ............. G06Q 30/02

OTHER PUBLICATIONS

Tewari et al., "Netcoin: A Traceable P2P Electronic Cash System," 2015 IEEE International Conference on Web Services, IEEE, all pages. (Year: 2015).*

(Continued)

*Primary Examiner* — Jacob C. Coppola
(74) *Attorney, Agent, or Firm* — Eversheds Sutherland (US) LLP

(57) ABSTRACT

Disclosed herein are certain embodiments of systems and methods for standardizing a plurality of digital wallet credits, into one digital wallet system. Expenditures of merchant issued credit stored in digital wallets are supported by tokenization of assets. Assets are encoded and represented by currencies tracked on public ledgers. Data is mined from the public ledger, decoded, and presented to users with a unified interface which allows users to view balances at any time of all digital wallets in their possession.

16 Claims, 11 Drawing Sheets

Related U.S. Application Data

(60) Provisional application No. 62/133,244, filed on Mar. 13, 2015.

(51) Int. Cl.

| | | |
|---|---|---|
| *G06F 3/0484* | (2013.01) | |
| *G06Q 20/02* | (2012.01) | |
| *G06Q 20/06* | (2012.01) | |
| *G06Q 20/10* | (2012.01) | |
| *G06Q 20/20* | (2012.01) | |
| *G06Q 20/28* | (2012.01) | |
| *G06Q 30/02* | (2012.01) | |
| *G06F 21/64* | (2013.01) | |

(52) U.S. Cl.
CPC ......... *G06Q 20/02* (2013.01); *G06Q 20/0655* (2013.01); *G06Q 20/10* (2013.01); *G06Q 20/20* (2013.01); *G06Q 20/28* (2013.01); *G06Q 20/363* (2013.01); *G06Q 20/3678* (2013.01); *G06Q 20/389* (2013.01); *G06Q 30/0207* (2013.01); *G06Q 30/0238* (2013.01); *G06Q 2220/00* (2013.01); *H04L 2209/38* (2013.01); *H04L 2209/56* (2013.01)

(56) References Cited

U.S. PATENT DOCUMENTS

| | | | | |
|---|---|---|---|---|
| 9,117,237 | B2* | 8/2015 | Levitt | G06Q 30/02 |
| 2006/0224454 | A1* | 10/2006 | Kantor | G06Q 30/02 |
| | | | | 705/14.3 |
| 2008/0052164 | A1* | 2/2008 | Abifaker | G06Q 20/10 |
| | | | | 705/14.27 |
| 2010/0075630 | A1* | 3/2010 | Tillitt | H04W 4/24 |
| | | | | 455/406 |
| 2010/0191605 | A1* | 7/2010 | Nuttall | G06Q 20/10 |
| | | | | 705/17 |
| 2012/0215605 | A1* | 8/2012 | Gardner | G06Q 20/36 |
| | | | | 705/14.17 |
| 2012/0233073 | A1* | 9/2012 | Salmon | G06Q 40/00 |
| | | | | 705/44 |
| 2013/0191227 | A1* | 7/2013 | Pasa | G06Q 20/3674 |
| | | | | 705/14.73 |
| 2014/0114800 | A1* | 4/2014 | Levitt | G06Q 30/02 |
| | | | | 705/26.8 |
| 2016/0012424 | A1* | 1/2016 | Simon | G06Q 20/3674 |
| | | | | 705/67 |
| 2016/0217436 | A1* | 7/2016 | Brama | G06Q 20/06 |
| 2016/0267472 | A1* | 9/2016 | Lingham | G06Q 20/3676 |
| 2016/0267474 | A1* | 9/2016 | Lingham | G06Q 20/363 |
| 2016/0283941 | A1* | 9/2016 | Andrade | H04L 9/3247 |
| 2016/0292672 | A1* | 10/2016 | Fay | G06Q 20/363 |
| 2017/0046664 | A1* | 2/2017 | Haldenby | G06Q 20/0655 |
| 2017/0200147 | A1* | 7/2017 | Ansari | G06Q 20/349 |

OTHER PUBLICATIONS gyft.com, web images archived by web.archive.org, Dec. 16, 2014, all pages. (Year: 2014).*

Antonopoulos, "Mastering Bitcoin," O'Reilly, 2014, all pages. (Year: 2014).*

* cited by examiner

| First User | Second User | Server | Merchant |
|---|---|---|---|
| | | Purchases debit codes from merchant | |
| | | | Provides debit code to server |
| Purchases gift card from server | | | |
| | | Creates record for user, generates token, publishes to block chain | |
| Claims/scratches gift card ownership | | | |
| | | Assign debit code to token, publish to block chain | |
| Transfers gift card to another user | | | |
| | | Move token, publish transfer to block chain | |
| | Second user wants to make purchase | | |
| | | Provide authorization code to second user | |
| | Provides authorization code to merchant | | |
| | | | Checks authorization code with server |
| | | Matches authorization code to token, provides debit code to merchant | |
| | | | Charges second user purchase to debit code provided by server |
| | | Diminish token value, publish expenditure to block chain | |
| | | | Provides goods or services to second user |

Time ↓

FIG. 7

SYSTEMS AND METHODS FOR SECURING DIGITAL GIFT CARDS WITH A PUBLIC LEDGER

RELATED APPLICATION

This application claims priority to U.S. Ser. No. 14/658,097, titled "SYSTEM AND METHOD FOR ESTABLISHING A PUBLIC LEDGER FOR GIFT CARD TRANSACTIONS," and to U.S. Ser. No. 62/133,244, titled "SYSTEM AND METHOD FOR SECURING DIGITAL GIFT CARDS WITH A PUBLIC LEDGER," both filed on Mar. 13, 2015, the contents of both of which are hereby incorporated by reference.

FIELD OF THE INVENTION

The present disclosure relates to the tracking and recording transfers of digital assets. More specifically, the present disclosure relates to retaining public records of gift card purchases and transfers.

INCORPORATION BY REFERENCE

U.S. patent application Ser. No. 13/831,365, titled "SYSTEMS AND METHODS FOR DIGITAL GIFT CARD SELECTION," filed on Mar. 14, 2013, is incorporated by reference in its entirety and for all purposes to the same extent as if the patent application was specifically reprinted in this specification.

BACKGROUND OF INVENTION

Gift cards are digital asset which has value associated with a single entity. Gift cards are prone to fraud, digital gift cards are not portable from one digital wallet to another, and interfaces to digital gift card host systems is highly fragmented. One goal of this disclosure, for example, is to provide a standard, secure, and portable way to mint, issue, transfer, and redeem digital gift cards.

INCORPORATION BY REFERENCE

U.S. patent application Ser. No. 13/831,365 (Inventors: Levitt, et al.; Filed on Mar. 14, 2013), titled "SYSTEMS AND METHODS FOR DIGITAL GIFT CARD SELECTION" is incorporated by reference in its entirety and for all purposes to the same extent as if the patent application was specifically reprinted in this specification.

SUMMARY

Embodiments can include a method for minting digital gift cards on a secure public ledger such as Bitcoin, in such a way that relevant regulations and issuers' rules are fully enforced. Examples of such regulations in the United States include FinCEN "prepaid access" rules, which, for instance, forbids the transfer of prepaid credits from person to person.

Embodiments can also include a method for supporting a variety of assets, each with its own enforceable terms and rules, and combination of assets, for each gift card. For instance, a single gift card may combine two assets: prepaid credits that never expire, as well as bonus credits that expire on a certain date.

Embodiments can also include a method for transferring a digital gift card into a customer wallet, for instance upon purchase by a customer.

Embodiments can also include a method for preventing fraudulent transfer of digital gift cards' value through the use of short-lived tokens delivered in the customer wallet, instead of the traditional static serial numbers and PINs. Such method is designed that secure digital gift cards can be used at brick-and-mortar & online merchants with existing points of sale (POS) systems. This includes brick-and-mortar POS systems where the gift card's serial number is scanned (barcoded) or swipe (magnetic stripe), or online shopping carts of e-commerce players.

Embodiments can also include a system and method for uploading digital gift cards to a variety of wallet apps, such as Gyft Wallet® or Google Wallet®, and provide users with a consistent experience in those apps, for instance being able to check real-time balance for any card or send them easily and quickly from one wallet app to another.

Embodiments can also include a method for converting legacy plastic & paper gift cards, whose serial number and PIN is inherently static into digital gift cards secured by a public ledger.

BRIEF DESCRIPTION OF THE FIGURES

FIG. 1 illustrates the user interface of a sample blockchain system adapted for gift card use.

FIG. 7 is a time flow chart illustrating a sample order of operations for gift card transactions.

Figure 2A:
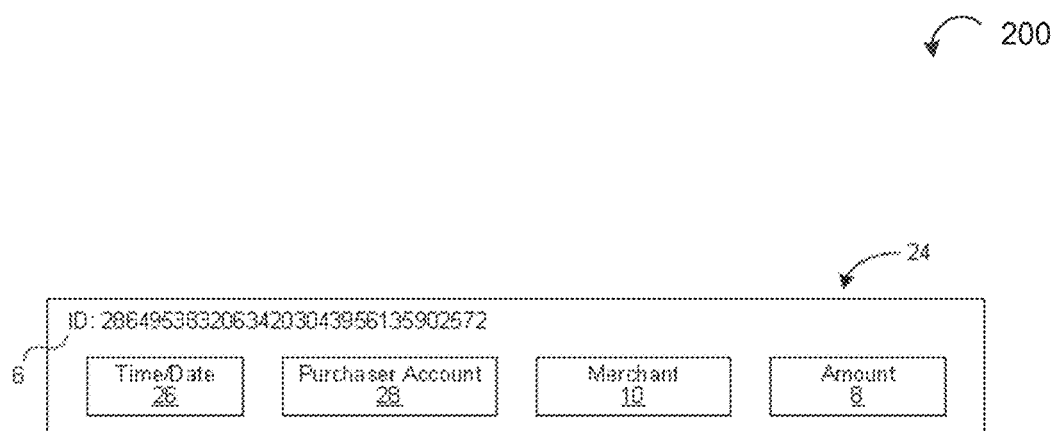
FIG. 2A illustrates a sample transaction record on the blockchain where a user purchases a gift card.

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa. Various illustrative embodiments are discussed herein. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

DETAILED DESCRIPTION

Gift cards in a purely electronic system do not use physical cards. The term, "gift card," is a misnomer, though still used to express a concept. In actual fact gift cards are no more than numerical codes with an associated value to a given corporation or entity. In using a mobile device enhanced gift card system, such as the Gyft mobile application available on iOS or Android, or another operating system of similar character, gift "cards" are displayed to users on their mobile devices, though no actual "card" exists. The displayed card is simply a digital artifact that the application is directed to present to the user. The user's device does not include additional code indicating the presence of the card—rather the evidence of "card" ownership exists merely on the application's host server and the host server directs the mobile application to display the "card" for the user. Reference to a "gift card" in this context merely refers to the concept of reasonably fixed debit with a specified entity. A blockchain is a public ledger. The public ledger includes all such transactions that have ever been executed. The blockchain is constantly growing as 'completed' blocks are added with a new set of recordings. The blocks are added to the blockchain in a linear, chronological order, like a chain.

Figure 1:
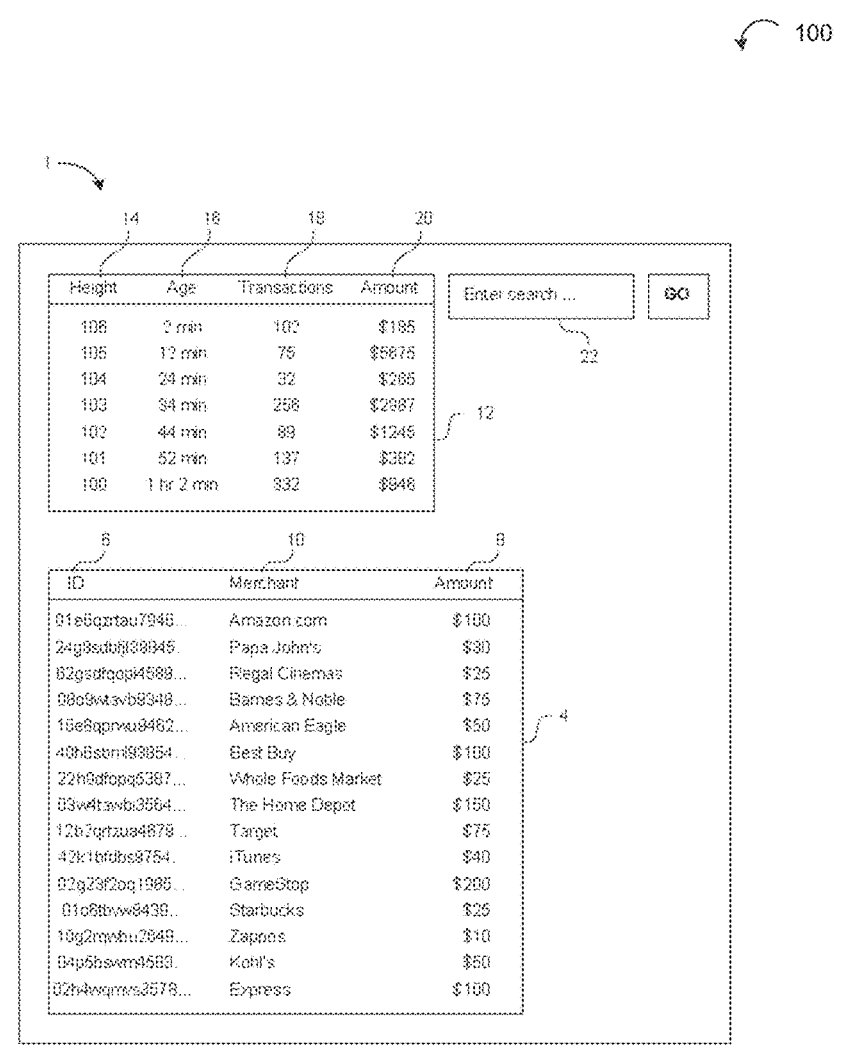

Referring now to FIG. 1, FIG. 1 is a representation of a blockchain interface 2. The blockchain interface 2 is a web interface that appears to users by use of a web browser such as Microsoft Internet Explorer, Mozilla Firefox, Apple Safari, Google Chrome, or another suitable program known in the art. The blockchain interface 2 will include a transaction stream 4. The transaction stream 4 displays records of transactions on the network and updates actively, in real-time, as users of the network perform transactions. The transaction stream 4 would include a transaction ID 6, the transaction ID 6 could be a hash code, or reference to a token or digital construct. The transaction stream 4 further includes the amount for which the transaction concerns ("amount") 8, and the merchant for which the gift card is with ("merchant") 10. The blockchain interface 2 also includes a block stream 12. The block stream 12 updates in a similar fashion to the transaction stream 4; however the block stream 12 displays data concerning collections of transactions, which are compiled into "blocks." Blocks can be a collection of all transactions is a given period, or they might be sorted differently, such as by merchant 10. Alternatively blocks could be compiled or by reference to a particular token or other digital construct. The data presented in the block stream 12 includes a block height 14 designation number which grows linearly as blocks are added to the chain, the age 16 of each block, the number of transaction records 18 included in each block, and the block amount 20 which denotes the amount of money transacted in each block. The blockchain interface 2 would additionally include a search bar 22 which a user would use to search for particular transaction records or blocks.

The blockchain interface 2 illustrated in FIG. 1 is merely illustrative. Other elements could be included in the interface such as including the age of a given transaction in the transaction stream 4, sorting blocks by merchant 10, or presenting information in another preferred manner. Further, additional analytical charts could be presented through additional web interface pages. Such analytical charts could include data such as trends concerning how long users of accounts held on to tokens, data concerning specific merchant trends, or other chartable data relevant to gift card transactions.

Referring now to FIGS. 2A, 2B, 2C, and 2D, the 2 series of FIG.s illustrates different kinds of transaction records associated with differing transactions. FIG. 2A is a gift card purchase record 24 which would include a transaction ID 6, a time stamp 26, a purchaser account 28 which identifies who purchased the gift card by a real name, or an account name pseudonym. The gift card purchase record 24 further includes reference to the merchant 10 and the amount 8.

Figure 2B:
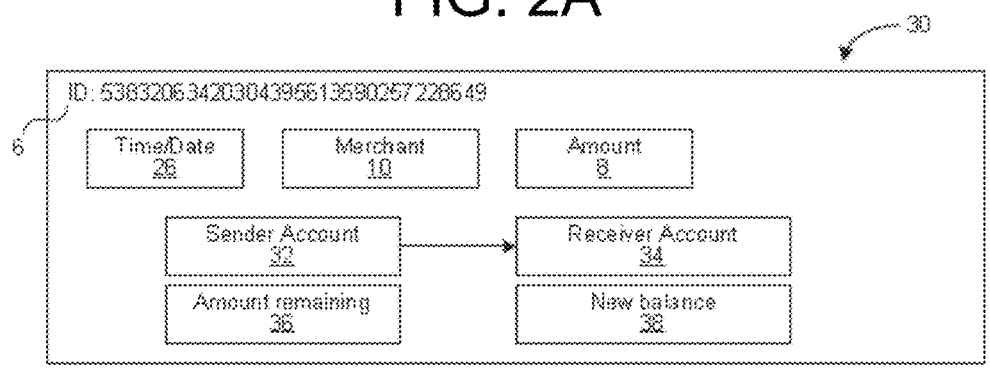
FIG. 2B illustrates a sample transaction record on the blockchain where a user transfers a gift card to another user.

FIG. 2B is a gift card transfer record 30 which would include a transaction ID 6, a time stamp 26, a sender account 32 which identifies the grantor of the card the gift card by a real name, or an account name pseudonym. Similarly, the gift card transfer record 30 has a receiver account 34 which is identified in the same manner as the sender account 32. Additionally, associated with the sender account 32, the remaining balance 36 on the sender's account will be displayed along with the new balance 38 of the receiver's account. The gift card transfer record 30 further includes reference to the merchant 10 and the amount 8.

Figure 2C:
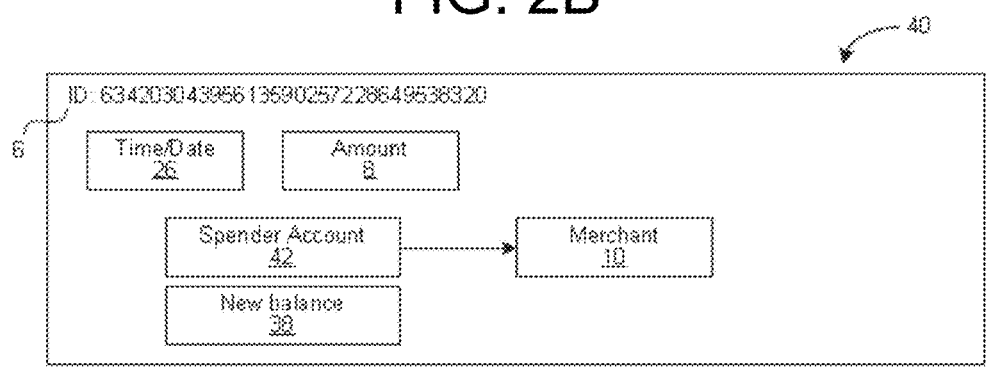
FIG. 2C illustrates a sample transaction record on the blockchain where a user expends gift funds at a specified merchant.

FIG. 2C is a gift card expenditure record 40 which would include a transaction ID 6, a time stamp 26, a spender account 42 which identifies who is expending the funds of the gift card by a real name, or an account name pseudonym. The gift card expenditure record 24 further includes reference to the merchant 10, the amount 8 expended and the new balance 38 of the account.

Figure 2D:
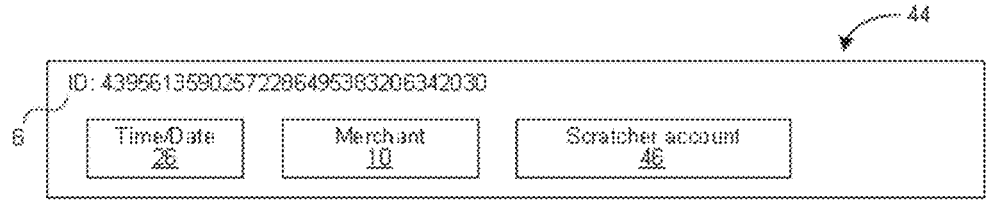
FIG. 2D illustrates a sample transaction record on the blockchain where a user claims gift funds at a specified merchant.

FIG. 2D is a gift card claim record 44 which denotes that a given account wishes to begin receiving authentication codes (discussed below). Gift card claim records 44 would include a transaction ID 6, a time stamp 26, a scratcher account 46 which identifies who claims the gift card by a real name, or an account name pseudonym. The gift card claim record 44 further includes reference to the merchant 10. The transaction records illustrated in the 2 series of FIGs is merely illustrative. Other elements could be included as necessary.

Figure 3:
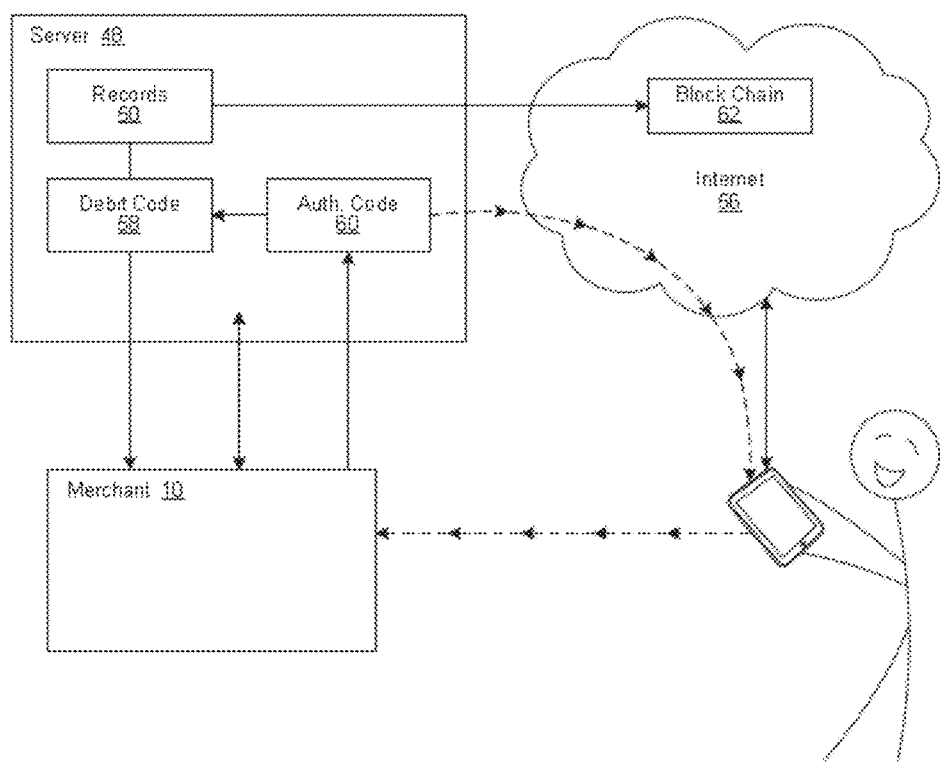
FIG. 3 illustrates communication and data transfer between entities using a mobile-based gift card exchange adapted to a blockchain publisher system.

Referring to FIG. 3, FIG. 3 is illustrates communication and data transfer between entities using a mobile-based gift card exchange adapted to a blockchain publisher system. The system centers around a web server 48 the web server 48 stores business records 50. Customers 52 of the system would use web-enabled devices 54 to contact the server 48 through the Internet 56 and purchase gift cards for a given merchant 10. Web-enabled device 54 would include mobile phones, laptop computers, tablet computers, desktop computers, or another suitable device capable of contacting a web server.

The server 48 acquires a gift card on behalf of the customer 52, from a merchant 10. That debit card is manifested by a debit code 58. The debit codes 58 may be used. For the system to work efficiently, it is not necessary for the server 48 to obtain debit codes 58 individually each time a customer 52 orders. A given debit code 58 may cover the orders of multiple customers 52, or inversely, multiple debit codes 58 may cover a single order from a single customer 52. The debit codes 58 on the server 48 may predate an order by a customer 52 or the debit codes 58 may be acquired in response to an order by a customer 52.

Customers 52 would not actually see or have direct access to debit codes 58. Instead, customers 52 see variable authentication codes 60. Customers 52 who have purchased a gift card from the server 48, will have an account stored on the server 48 in server records 50. This account could be represented by a token, or some other digital construct which is associated with the customer's account stored in records 50. As an optional step the system would make use of a "scratching" feature where a customer 52 would indicate to the server 48 that a purchased gift card should be claimed. Before the "scratch" occurred, the server 48 would not have to assign a debit code 58 to the customer 52. Though the records 50 would should that the customer 52 had a debit account of a given monetary value, that account would not have to be assigned a code to enable actually expending the monetary value of the account until the customer 52 scratched, or claimed the gift card. Once an gift card is claimed, the customer 52 receives periodic variable authentication codes 60 through the Internet 56.

Variable authentication codes 60 change on a regular basis, such that no code is usable forever. The lifetime of a variable authentication code 60 could be measured in seconds or minutes. When one variable authentication code 60 "dies," another is issued. Optionally, to reduce purchase failure, the lifetime of variable authentication codes 60 could overlap, such that in a given moment it would be possible that two variable authentication codes 60 would be valid. A alternative model for variable authentication codes 60 issuance would involve simply issuing a variable authentication code 60 with a set lifetime anytime a customer 52 accessed their account on the server 48 while issuing no variable authentication codes 60 while a customer's account remained dormant.

In use, a variable authentication code 60 can be used at a specified merchant 10. The merchant 10 then communicates the variable authentication code 60 supplied by the customer 52 to the server 48. Should the variable authentication code 60 supplied by the customer 52 match the code 60 that is "live" on the server 48, the server 48 will indicate to the merchant 10 one or more debit codes 58 to use to fulfil the customer's 52 order.

Alternatively to expending gift card monetary value at a merchant 10, customers 52 can exchange gift cards with one another. The transaction, along with merchant expenditure transactions would be recorded in records 50, and the records 50 would be published on the internet 56 to a blockchain 62.

Figure 4:
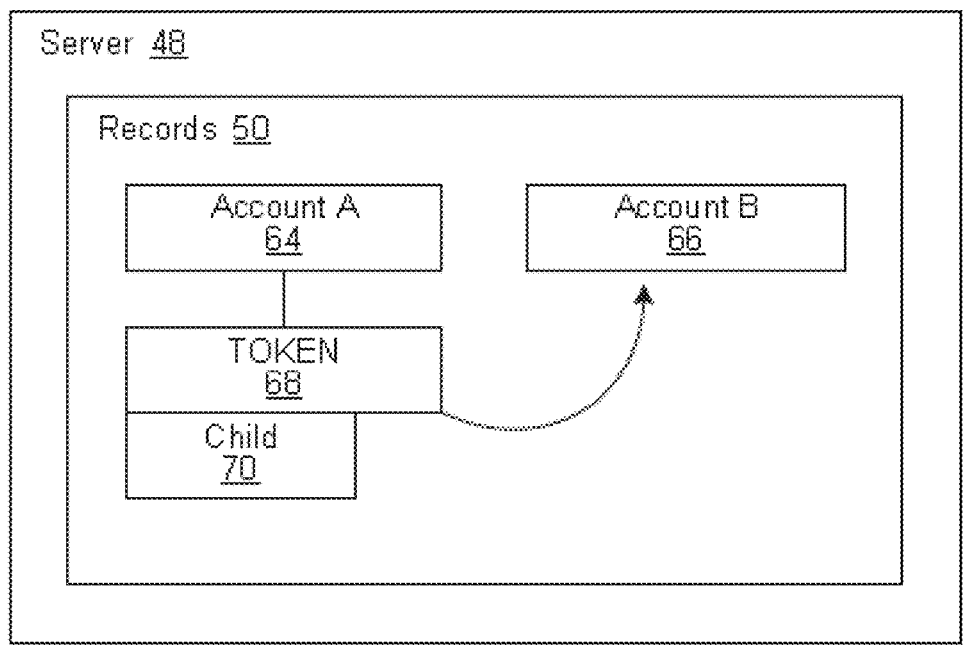
FIG. 4 illustrates a gift card transfer between accounts.

Referring now to FIG. 4, with continued reference to FIG. 3, FIG. 4 illustrates a gift card transfer between accounts. On the server 48, stored in records 50, are user accounts A 64 and user account B 66. In order to record value on a blockchain 62, a token 68 or some other digital contract would be used. When user account A 64 intends to give a gift card to user account B 66, a token 68 is transferred from user account A 64 to user account B 66. The transfer of the token 68 is published to the blockchain 62. In one embodiment of a token 68, the token 68 is simply an account flag with a unique ID. In a second embodiment of a token 68, the token 68 is a simple record which includes a reference to a single debit code 58 and is used primarily to act as a public reference to the debit code 58 without revealing the debit code 58.

In a third embodiment of a token 68, the token 68 is a dynamic record which serves to keep an accounting of all gift card business conducted by an account. As a dynamic record, the token 68 would keep track of one or more debit codes 58 which are associated with the monetary value owed by a specific merchant to the token holder. Each of these debit codes 58 may be shared over numerous tokens 68. A first token 68*a* may have 100% interest in a first debit code 58*a*, and 25% interest in a second debit code 58*b*, whereas a second token 68*b* may have the remaining 75% of the interest in the second debit code 58*b*. Should a user purchase more credit with a given merchant 10, additional debit codes 58 would be added to the token 68. If the token acts as a dynamic record, transferal from user account A 64 to user account B 66 would involve transfer of the entire token 68, or the creation of a child token 70 which contained partial value of the original token 68. A child token 70 would either remain with user account A 64 and the original token 68 would be transferred to user account B 66, or vice-versa.

Figure 5:
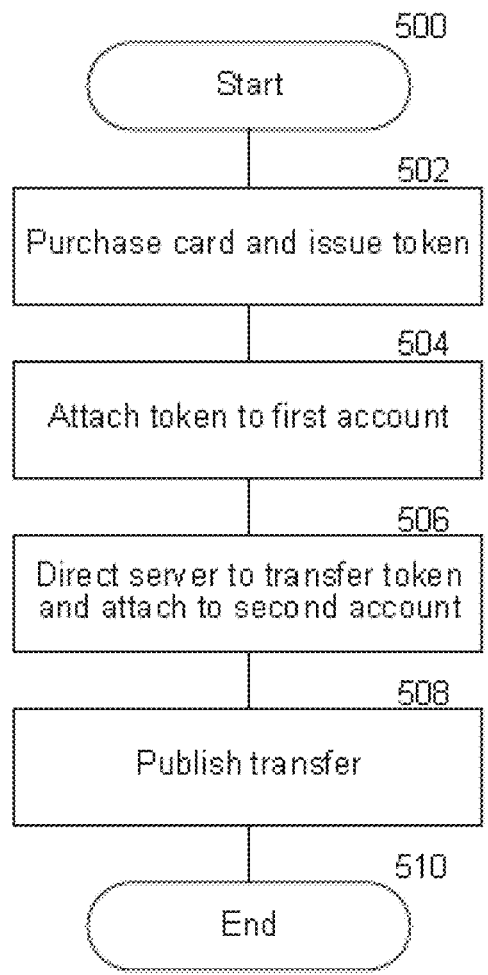
FIG. 5 is a flow chart of a published transfer of a gift card from one user account to a second user account.

Referring now to FIG. 5, FIG. 5 is a flow chart of a published transfer of a gift card from one user account to a second user account. First, a user of the system will purchase a gift card through an online web server, and the web server will issue a representative token for that gift card (502). The web server then attaches the issued token to the user's account (504). Through the user interface, the user would direct the server to transfer the gift card to another user's account—the transfer of the gift card would transfer the representative token between accounts as well (506). Finally, the token transfer of step 506 will be published online to a blockchain ledger (508).

Figure 6:
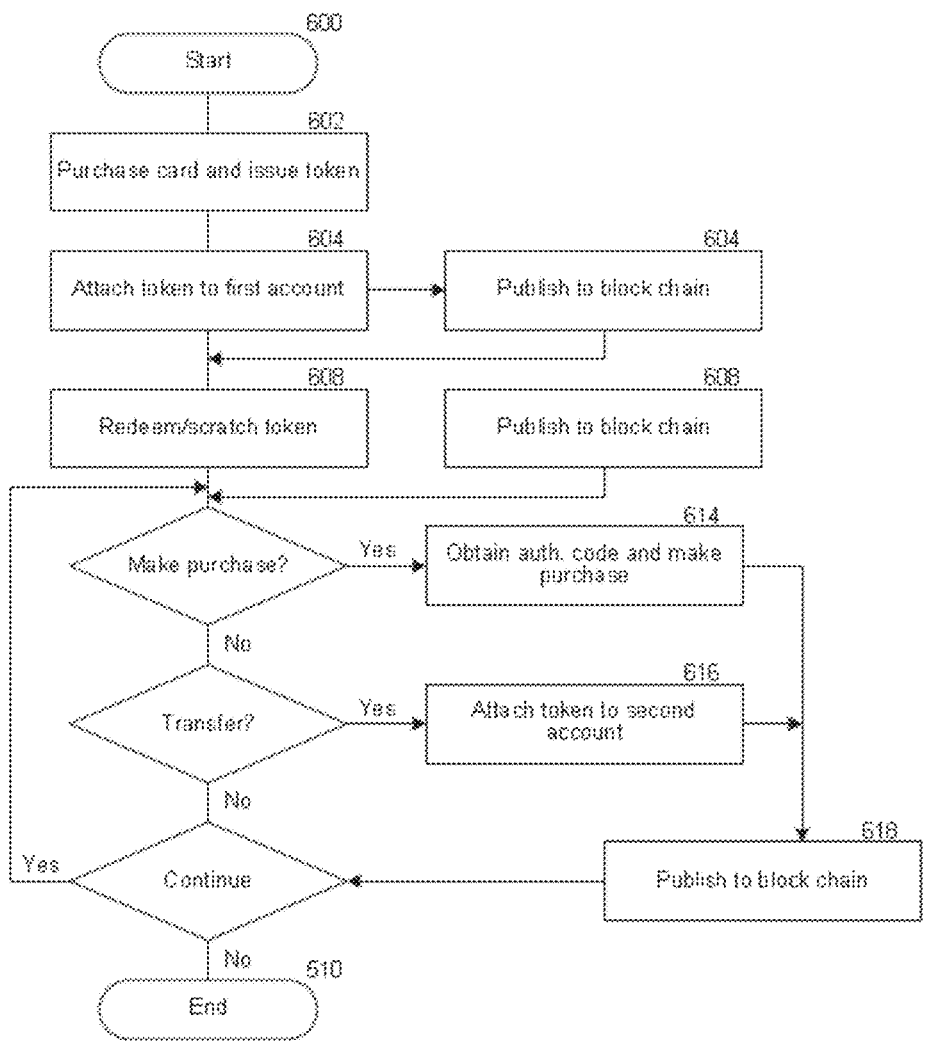
FIG. 6 is a flow chart illustrating the method for publishing numerous types of transactions in a mobile-based gift card exchange.

Referring now to FIG. 6, FIG. 6 is a flow chart illustrating the method for publishing numerous types of transactions in a mobile-based gift card exchange. First, a user of the system will purchase a gift card through an online web server, and the web server will issue a representative token 68 for that gift card (602). The web server then attaches the issued token to the user's account (604). When the token is attached to the user's account the server will publish the token generation to a public blockchain ledger (606). The user will eventually claim the purchased gift card. Claiming or "scratching" the gift card could occur immediately after purchase, or as late as when the user intended to redeem the gift card with the merchant. When the gift card is claimed by the user, the server will assign the user one or more debit codes or part of a debit code (608). The assignment of debit code would also be published to the public blockchain, though the debit code itself would not be referenced—rather the debit code itself would be kept private by the server (610). Once a debit code is assigned to the token, the user has the option to make purchases. To make a purchase, the server will send the user an authorization code, the code is used at the merchant. The merchant references the authorization code to the server which provides the assigned debit code to the merchant. The merchant charges to the debit code and the server records the transaction with respect to the token (614). A user can also transfer a token to another user. While FIG. 6 displays the transfer query after the claim step, tokens may optionally be transferred between users before the token is claimed. The token simply switches accounts without having an assigned debit code. Regardless of when the transfer occurs, the server records the transfer (616). With either a merchant charge to an assigned debit code, thereby diminishing a token, or a transfer of a token the server will publish this information to the public blockchain (618).

Referring now to FIG. 7, FIG. 7 is a time flow chart illustrating a sample order of operations for gift card transactions. The time flow chart includes four columns, each column representing a party to described transactions. Moving down the chart progresses the transactions in time. The space between actions is not standardized for time, and the time between a given action and the subsequent action could be measured anything between milliseconds and years. Some operations on the time chart could be performed in a different order or not at all—this chart is provided merely to present an illustrative example. The content of the chart is self-explanatory.

In certain embodiments, the server would manage an inventory of debit codes for one or more merchants. The inventory would provide a marketplace for gift cards without requiring the merchant's own infrastructure to be operational in order for the sale of gift cards. The inventory would not necessarily require that a given debit code be entirely used by any one customer. Each debit code could be shared amongst a group of customers, or multiple debit codes could serve to fulfil a single gift card purchase. The server would determine which debit codes were expended, thus it is feasible that a given debit code would only remain with a given customer for a limited period of time before moving the code to assigning a different debit code. As long as the customer's credit with a given merchant was accounted for, the debit codes actually assigned to the customer would be interchangeable.

With respect to FIGS. 8-11, the following description details certain embodiments of tracking and recording transfers of digital assets, and more specifically, the certain embodiments directed to retaining public records of gift card purchases and transfers.

Gift cards are merchant-specific value issued in the form of a public serial number and oftentimes together with a concealed PIN. Gift cards have traditionally been issued with the serial number encoded on the magnetic stripe of a plastic card or as a barcode-encoded serial number on plastic or paper card. Increasingly, gift cards are being uploaded or directly bought on Web sites and mobile apps like the Gyft mobile Application®, where they only exist as digital representations. Such gift cards are called virtual gift cards or digital gift cards.

Gift cards traditionally represent one asset, a prepaid asset, but digital gift cards increasingly represent more than one asset at a time, each with different terms and compliance requirements. For instance, a buyer may have purchased an offer to buy $100 worth of credits at a business for $90 in cash, with the extra $10 expiring after a certain date, while the $90 prepaid never expire.

It is not always possible to enforce the use of the PIN at redemption, and because serial numbers are not concealed, gift cards are fraught with fraud. Serial numbers printed on paper or plastic gift cards may get compromised at any time between their minting on the issuer's host and the purchase by the customer, for instance by unscrupulous employees of companies issuing, re-selling or retailing the serial numbers. This lack of security is hampering the wider adoption of gift cards in general and digital gift cards especially as a payment mechanism.

Digital gift cards are also not easily transferable from one digital wallet to another. Different wallets may offer different related services or different pricing, but buyers of digital gift cards typically can't easily transfer a digital gift card they purchased from one wallet to another wallet. This lack of portability is limiting competition and ultimately reducing the value of digital gift cards to consumers.

Digital gift cards are also very fragmented in terms of how they are purchased, authenticated, balance-checked, cancelled, re-gifted or redeemed. Different gift card issuers offer different computer programming interfaces for applications to perform actions on the digital gift cards, resulting in high development cost of digital gift card applications, lack of consistency in user experiences, and ultimately reduce the potential of digital gift cards as a payment mechanism. For instance, a gift card issuer may offer a computer programming interface to check a digital gift card balance, while another issuer does not.

Digital gift cards are regulated, for instance, in the US by the prepaid access rule. Fraud monitoring and ensuring compliance is difficult since there is no central record of transactions that investigators can use to trace movements of funds.

Secure public ledgers are ledgers recording the minting, transfer and redemption of digital assets. Public ledgers are maintained by a large number of distributed computers called miners. They offer a high level of security against unauthorized spend and against double-spend of digital assets through the use of public-key cryptography, decentralized record-keeping and decentralized consensus. They also provide a high level of traceability of funds movements that can facilitate fraud detection, prevention and resolution to the extent that the identity of account holders is known. The most popular example of a secure public ledger is Bitcoin®, but many other public ledger implementations exist.

Figure 8:
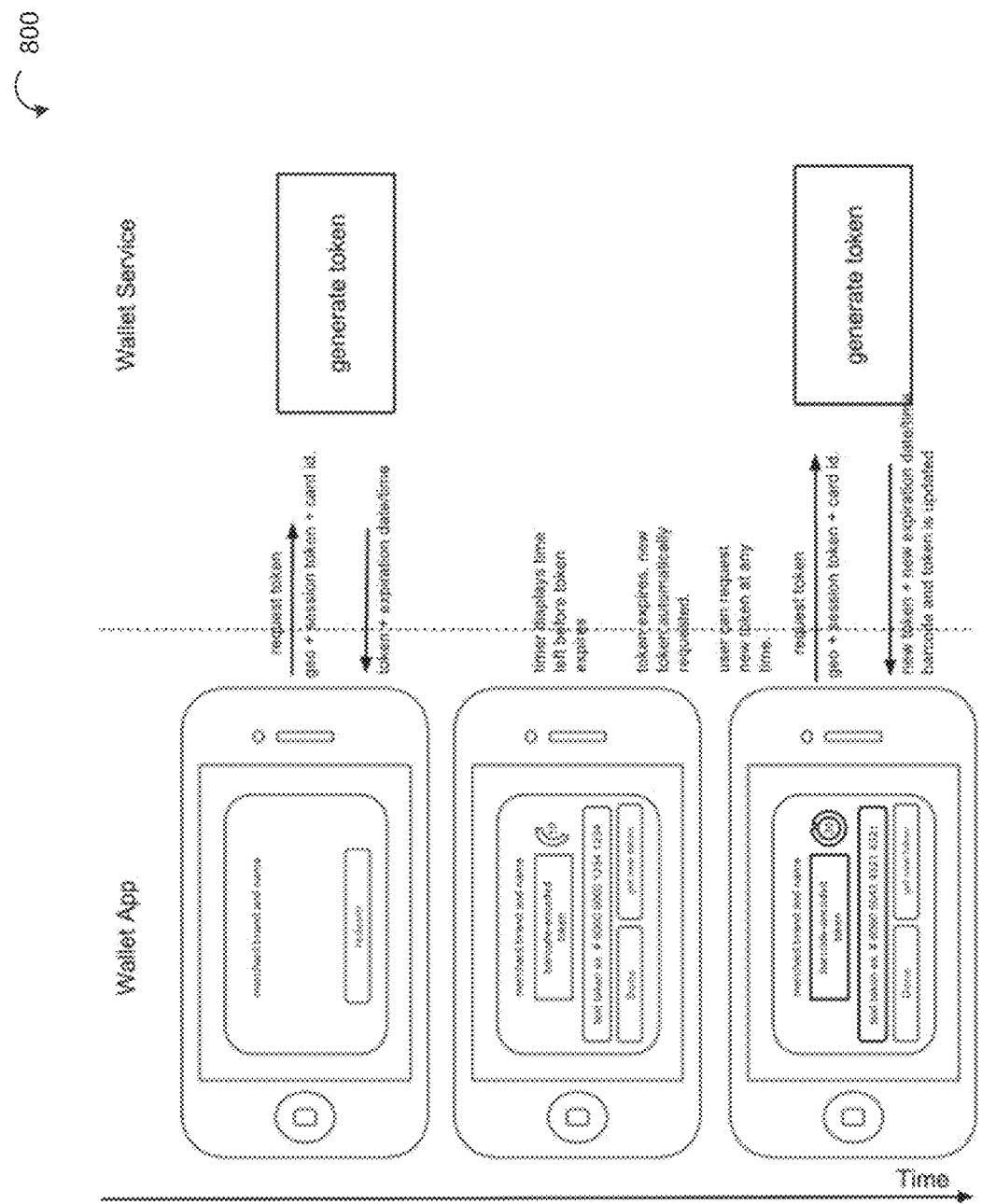
FIG. 8 is an illustrative example of tokenization of digital wallets, according to an embodiment of the disclosure.

With respect to FIG. 8, when the cardholder wants to transact, he/she bring ups the wallet app, authenticates to the app with a username/password or other secure authentication mechanism, and selects the card. The cardholder then taps redeem. At that moment, the wallet app contacts the wallet service with the authentication token and requests a short-lived card token. The card token is a 19 digit number. Other numbers of digits are also acceptable. Upon verification of the authentication token, the wallet service returns a card token with an expiration date/time. This expiration date/time can vary from wallet service provider to wallet service provider but typically lasts long enough to present the device to be scanned, typed in or read by a contactless device at the point of sale. If the card token expires while the cardholder is presenting the token at the point of sale, the wallet will automatically requests a new card token. The cardholder or person holding the device can also request a new token at any time by hitting a button on the wallet application screen. The wallet application displays a timer showing how long before the card token expires.

Figure 9:
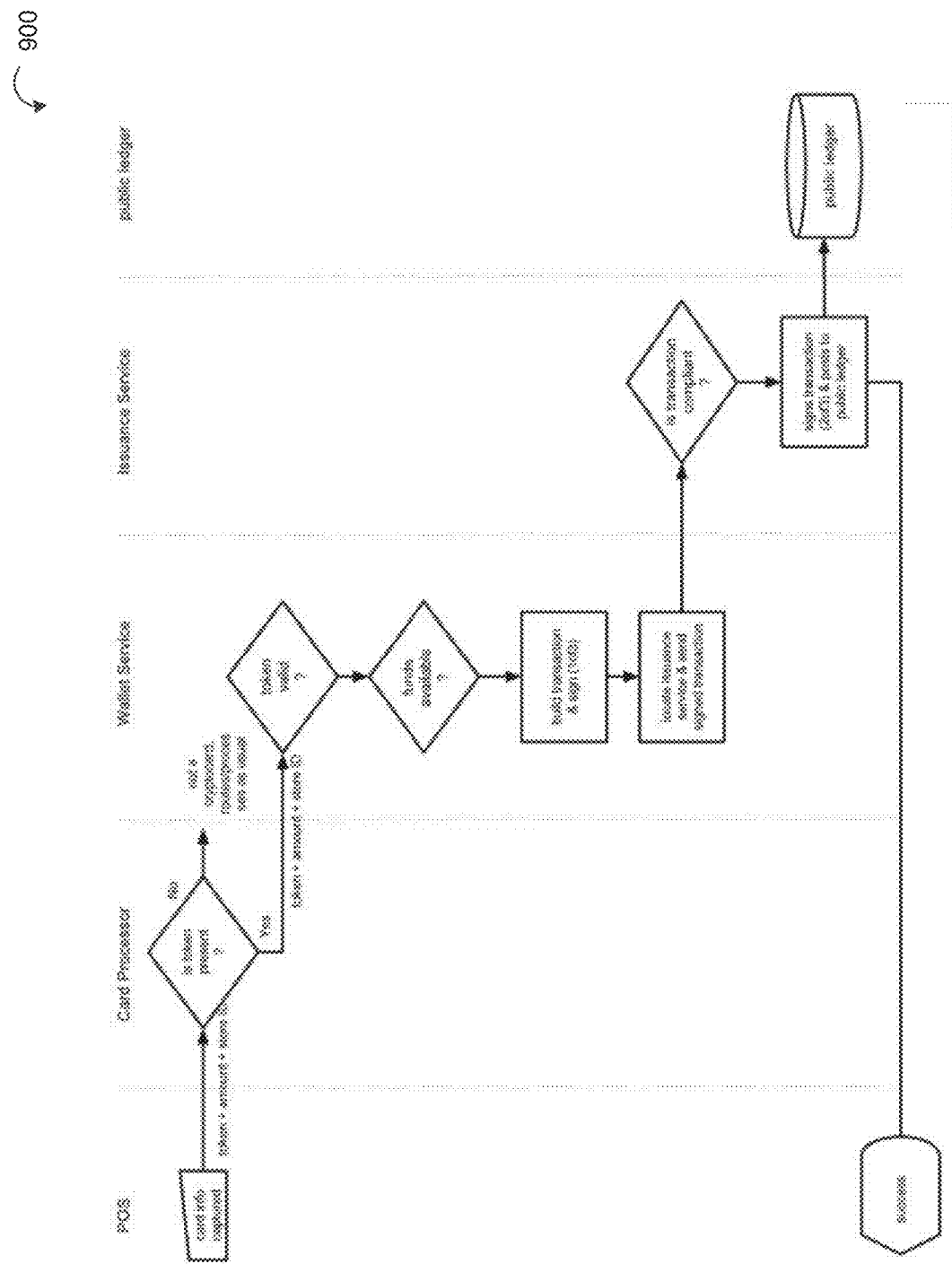
FIG. 9 is an example time flow chart for transactions using merchant issued currency, according to an embodiment of the disclosure.

With respect to FIG. 9, upon presentation to the POS or online shopping cart and successful reading by the POS or online shopping cart of the card token, the card token goes through the merchant's payment system, and the merchant is able to detect that the card token is actually a token for a secure digital gift card because the card token starts with a specific 6-digit IIN (Issuer Identification Number, also called BIN) that the wallet service provider registered. Upon detection of the token, the merchant routes the requests to the wallet service provider server. The wallet service provider server validates the token, and if the token is valid, and assets are available at the token's corresponding address or addresses, and these assets are accepted by the merchant, the wallet service prepares a public ledger transaction and signs it with the cardholder's private key. The issuance service provider is then notified of the new transaction, and the issuance service provider validates the transaction's compliance with regulations and cardholder services. Assuming the transaction is compliant, the issuance service signs the transaction with its authorization key and posts the transaction to the ledger, and returns to the wallet service provider a success and transaction ID.

Figure 10:
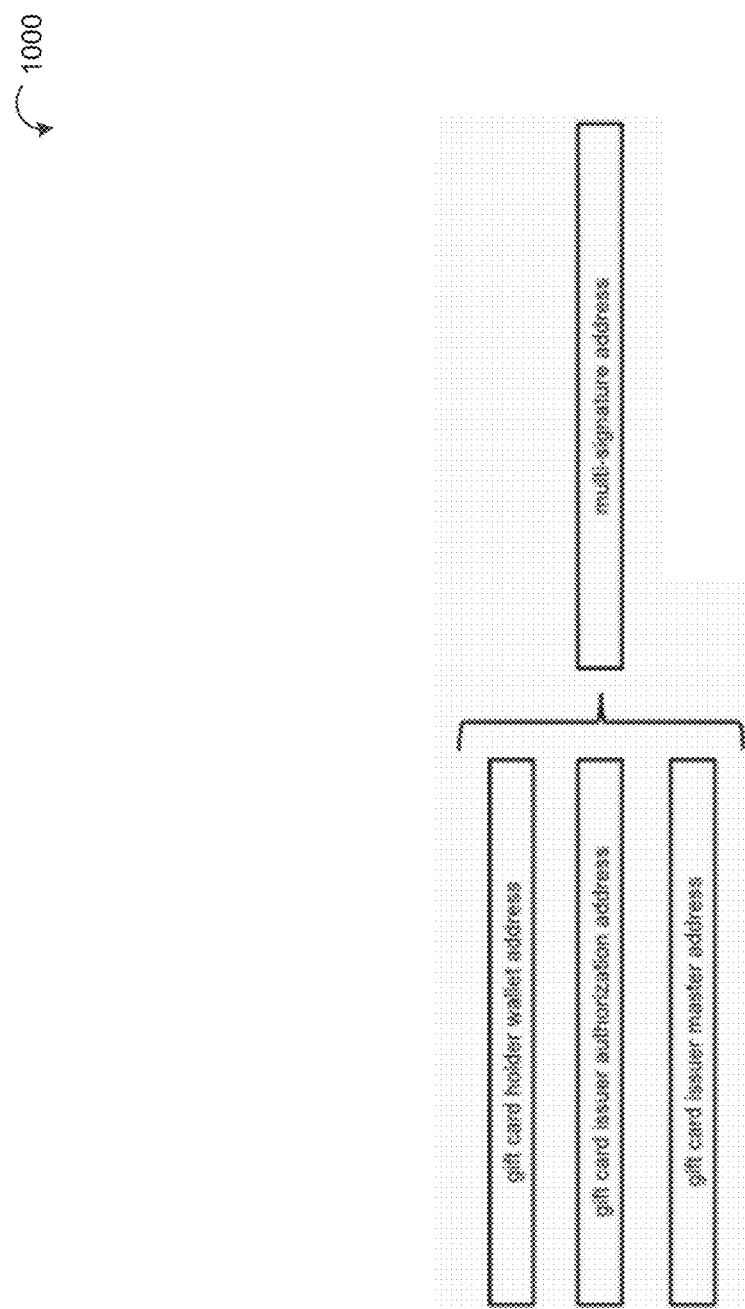
FIG. 10 is a sample of an authorization scheme, according to an embodiment of the disclosure.

With respect to FIG. 10, authorization of transactions occurs through use of "2 of 3 signatures." For each digital gift card on the secure ledger there is what is known as a 2 of 3 address holding the merchant-issued value. A 2 of 3 address is generated from 3 different addresses using an open source method available on secure public ledgers. Funds transfer out of the 2 of 3 address are only accepted by the secure public ledger if 2 of the 3 private keys of the respective 2 of the 3 addresses used to generate the 2 of 3 addresses are present. The present disclosure is about using 2 of 3 addresses to secure and enforce compliance of digital gift cards. The present disclosure utilizes 2 of 3 addresses as follows:

one of the 3 addresses used is controlled by a private key belonging to the digital gift cardholder and held in the cardholder's wallet service one of the 3 addresses used is controlled by a private key belonging to the issuance service provider who ensures compliance with regulations.

one of the 3 addresses used is controlled by a private key belonging to the issuance merchant who ensures compliance with its own terms.

transaction is authorized only if 2 of 3 signatures for these 3 addresses are present:

the gift card holder and the gift card issuance service both sign the transaction. This ensures that funds cannot move to any address, but only to a few addresses that the gift card issuance service provider authorizes.

the gift card issuance services and the issuing merchant sign the transaction. This ensures that funds can move from the address even if the cardholder does not authorize them, this is necessary to ensure compliance with terms such as dormancy fees or expiration.

Figure 11:
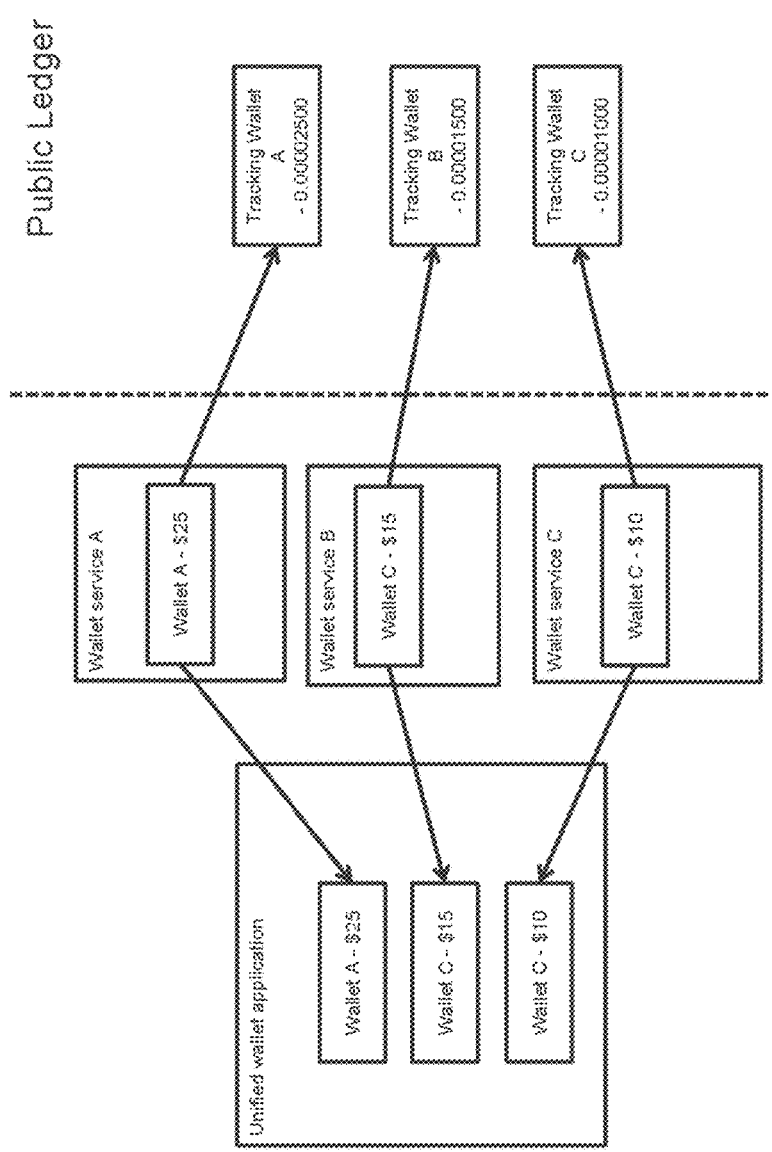
FIG. 11 is an example block diagram illustrating encoding wallets to a public ledger, according to an embodiment of the disclosure.

With respect to FIG. 11, in order to standardize a plurality of digital wallets, merchant-issued currencies are encoded onto public ledgers. The encoding is accomplished using the native capabilities of the public ledgers to issue custom currencies, if available, or as extensions leveraging the built-in extensibility capabilities of the public ledgers. Where custom currencies are not available, merchant issued currency is represented in fractions of the currency of the public ledger (public currency).

In operation a user first provides a unified application interface with necessary information to access one or more of the user's digital wallets (Wallets A, B, and C). The digital wallets could consist of a plurality of merchant issued currencies (Merchants A, B and C, respectively). Wallets A, B and C are normally accessed through separate interfaces using merchant specific applications or third party applications. The unified application then inventories the user's digital wallets and presents all of the user's digital wallets, A-C, in a single user interface (unified wallet) wherein each individual digital wallet inside the unified wallet can be individually selected and have card tokens issued to the application interface. The user provides the card token to the POS as described above. The proper digital wallet is charged.

As an illustrative example wherein merchant currency is encoded to a public currency, a digital wallet would have $25.00 associated with Merchant A (Wallet A). Wallet A, could be on any number of online wallet services—Merchant A's personal service, or some other third party service. Wallet A, with a $25 credit is represented on the public ledger by 0.00002500 of the public currency. When Wallet A is brought into the unified wallet, there is an associated minting cost in acquiring the requisite public currency, thereby generating a public currency wallet. The user never has access to the public currency wallet. The public currency wallet is merely a representation of Wallet A, contained within the unified wallet. The public currency wallet is owned by the administrator of the unified application.

As Wallet A is spent or redeemed with Merchant A, the proper wallet service processes the expenditure. Additionally, the public currency digital wallet is emptied into a central wallet account owned by the administrator of the unified application. If $10 is redeemed from Wallet A, 0.00001000 from the public currency wallet is shifted into the central wallet. The transactions of the public currency are recorded on a public ledger.

As additional wallets from various wallet services are brought into the unified wallet, additional representative public currency wallets are created from the central wallet account. In this way, the public currency is reused repeatedly as the public currency only circulates between accounts owned by the administrator of the unified wallet.

To present a reliable user interface to the user, data is retrieved from the public ledger and decoded such that the data is presented so only merchant issued currency is displayed to the user rather than public currency or public assets.

The examples in the disclosure above serve merely as illustrative examples. Methods recited could be conducted in any order that makes sense, communicative action between objects could occur in reverse where applicable or more or less frequently than disclosed. Objects which are depicted in the figures as a part of a greater object could in part or in whole perform the duties of the greater object. Conversely, greater objects could adopt the duties of the subordinate object. Where specific values are referenced, other values could be inserted in such a manner which is not wholly contradictory to the whole disclosure.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The claimed invention can include:

1. A method comprising:
   generating, by one or more computer processors coupled to at least one memory, a user interface, the user interface displaying a plurality of digital wallets, the digital wallets each comprising a certain value of merchant issued currency;
   encoding the certain value of merchant issued currency to a currency tracked by a public ledger;
   establishing a plurality of tracking wallets, the tracking wallets corresponding to each of the plurality of digital wallets, wherein the plurality of tracking wallets comprise encoded amounts of the currency tracked by the public ledger which represent the balance of merchant issued currency on each of the plurality of digital wallets;
   depleting the tracking wallets into a pooled account as the user depletes the plurality of digital wallets;
   retrieving encoded data from the public ledger concerning the plurality of tracking wallets; and
   decoding the encoded data and presenting decoded data for users in a graphic interface.

2. The method of claim 1, wherein the public ledger is publicly accessible and records minting, transfer, and redemption of digital assets.

3. The method of claim 1, further comprising:
   receiving a selection of an individual digital wallet of the plurality of digital wallets; and
   determining a card token issued to the application interface for the individual digital wallet, wherein the card token can be redeemed at the merchant.

4. The method of claim 1, further comprising:
   receiving a request to add a digital wallet to the plurality of digital wallets;
   acquiring a requisite amount of the currency tracked by the public ledger representing a value associated with the digital wallet; and
   generating a public currency wallet using the requisite amount of the currency, wherein the public currency wallet represents the digital wallet.

5. The method of claim 4, wherein an owner of the digital wallet is prevented from accessing the public currency wallet.

6. The method of claim 4, further comprising:
   determining that at least a portion of the value associated with the digital wallet has been redeemed;
   depleting the public currency wallet based at least in part on the at least the portion of the value;
   transferring the depleted portion of the public currency wallet to a central wallet; and
   recording the transaction of the public currency on the public ledger.

7. The method of claim 1, wherein the currency tracked by the public ledger is a public currency.

8. The method of claim 1, wherein encoding the certain value of merchant issued currency to the currency tracked by the public ledger comprises:
   representing the merchant issued currency as a fraction of the currency of the public ledger.

9. A device comprising:
   at least one memory that stores computer-executable instructions;
   at least one processor configured to access the at least one memory and execute the computer-executable instructions to:
      generate a user interface, the user interface displaying a plurality of digital wallets, the digital wallets each comprising a certain value of merchant issued currency;
      encode the certain value of merchant issued currency to a currency tracked by a public ledger;
      establish a plurality of tracking wallets, the tracking wallets corresponding to each of the plurality of digital wallets, wherein the plurality of tracking wallets comprise encoded amounts of the currency tracked by the public ledger which represent the balance of merchant issued currency on each of the plurality of digital wallets;
      deplete the tracking wallets into a pooled account as the user depletes the plurality of digital wallets;
      retrieve encoded data from the public ledger concerning the plurality of tracking wallets; and decode the encoded data and presenting decoded data for users in a graphic interface.

10. The device of claim 9, wherein the public ledger is publicly accessible and records minting, transfer, and redemption of digital assets.

11. The device of claim 9, wherein the at least one processor is further configured to access the at least one memory and execute the computer-executable instructions to:
   receive a selection of an individual digital wallet of the plurality of digital wallets; and
   determine a card token issued to the application interface for the individual digital wallet, wherein the card token can be redeemed at the merchant.

12. The device of claim 9, wherein the at least one processor is further configured to access the at least one memory and execute the computer-executable instructions to:
   receive a request to add a digital wallet to the plurality of digital wallets;
   acquire a requisite amount of the currency tracked by the public ledger representing a value associated with the digital wallet; and
   generate a public currency wallet using the requisite amount of the currency, wherein the public currency wallet represents the digital wallet.

13. The device of claim 12, wherein an owner of the digital wallet is prevented from accessing the public currency wallet.

14. The device of claim 12, wherein the at least one processor is further configured to access the at least one memory and execute the computer-executable instructions to:
   determine that at least a portion of the value associated with the digital wallet has been redeemed;
   deplete the public currency wallet based at least in part on the at least the portion of the value;
   transfer the depleted portion of the public currency wallet to a central wallet; and
   record the transaction of the public currency on the public ledger.

15. The device of claim 9, wherein the currency tracked by the public ledger is a public currency.

16. The device of claim 9, wherein the at least one processor is configured to encode the certain value of merchant issued currency to the currency tracked by the public ledger by accessing the at least one memory and execute the computer-executable instructions to:
   represent the merchant issued currency as a fraction of the currency of the public ledger.

* * * * *